(12) United States Patent
Tabor et al.

(10) Patent No.: US 9,378,514 B2
(45) Date of Patent: Jun. 28, 2016

(54) SECURE TOKENLESS TRANSACTION SYSTEM AND METHOD

(71) Applicants: Richard Tabor, Elizabeth, NJ (US); Jadniel N. Pimentel, Elizabeth, NJ (US)

(72) Inventors: Richard Tabor, Elizabeth, NJ (US); Jadniel N. Pimentel, Elizabeth, NJ (US)

( * ) Notice: Subject to any disclaimer, the term of this patent is extended or adjusted under 35 U.S.C. 154(b) by 0 days.

(21) Appl. No.: 14/531,384

(22) Filed: Nov. 3, 2014

(65) Prior Publication Data

US 2015/0046257 A1    Feb. 12, 2015

Related U.S. Application Data

(63) Continuation-in-part of application No. 13/682,013, filed on Nov. 20, 2012, now abandoned.

(60) Provisional application No. 61/563,066, filed on Nov. 23, 2011.

(51) Int. Cl.
| | |
|---|---|
| *G06Q 40/00* | (2012.01) |
| *G06Q 30/02* | (2012.01) |
| *G06Q 20/34* | (2012.01) |
| *G06Q 20/22* | (2012.01) |

(52) U.S. Cl.
CPC ......... *G06Q 30/0255* (2013.01); *G06Q 20/227* (2013.01); *G06Q 20/3572* (2013.01); *G06Q 20/3574* (2013.01); *G06Q 30/0253* (2013.01)

(58) Field of Classification Search
USPC ................................................ 235/379–383
See application file for complete search history.

(56) References Cited

U.S. PATENT DOCUMENTS

| | | | |
|---|---|---|---|
| 5,530,232 A | 6/1996 | Taylor | |
| 5,613,012 A | 3/1997 | Hoffman et al. | |
| 5,870,723 A | 2/1999 | Pare et al. | |
| 6,308,890 B1 | 10/2001 | Cooper | |
| 6,873,715 B2 | 3/2005 | Kuo et al. | |
| 7,059,520 B1 | 6/2006 | Shtesl | |
| 7,152,045 B2 | 12/2006 | Hoffman | |
| 7,269,737 B2 | 9/2007 | Robinson | |
| 7,698,567 B2 | 4/2010 | Hoffman | |
| 7,747,528 B1 | 6/2010 | Robinson et al. | |
| 7,778,935 B2 | 8/2010 | Colella | |
| 7,783,578 B2 | 8/2010 | Mann, III et al. | |
| 8,090,657 B2 | 1/2012 | Mitchell et al. | |
| 8,190,527 B2 | 5/2012 | Stanley | |
| 8,459,562 B1 | 6/2013 | Field et al. | |
| 8,463,710 B2 | 6/2013 | Hoffman et al. | |

(Continued)

FOREIGN PATENT DOCUMENTS

| | | |
|---|---|---|
| EP | 1477943 A2 | 11/2004 |
| WO | WO 00/75885 A1 | 12/2000 |

(Continued)

*Primary Examiner* — Jamara Franklin
(74) *Attorney, Agent, or Firm* — Gearhart Law, LLC

(57) ABSTRACT

The tokenless transaction system described herein allows a user conduct financial transactions absent the need for his/her credit cards, debit cards, promotional cards, discount cards, and all other cards typically used in executing a financial transactions. In the same manner, the chances to have a card lost or stolen are reduced, bolstering the security of the user's financial information. The transaction terminals list the entire collection of a user's credit cards and the like and allow the user to access any one or a combination of the cards to finish a financial transaction. These accounts are accessed via multiple layers of security and the system further employs various security strategies to protect the user's sensitive information.

17 Claims, 5 Drawing Sheets

(56) References Cited

U.S. PATENT DOCUMENTS

| | | |
|---|---|---|
| 8,540,147 B2 | 9/2013 | Block et al. |
| 8,630,933 B1 | 1/2014 | Lapsley et al. |
| 2004/0020984 A1* | 2/2004 | Clark ............... G06Q 20/18 235/382 |
| 2004/0024703 A1 | 2/2004 | Roskind |
| 2005/0038741 A1 | 2/2005 | Bonalle et al. |
| 2005/0216728 A1 | 9/2005 | Relan et al. |
| 2005/0256746 A1 | 11/2005 | Zaleski |
| 2006/0064380 A1 | 3/2006 | Zukerman |
| 2006/0186212 A1 | 8/2006 | Cooper |
| 2007/0090182 A1 | 4/2007 | Phagura et al. |
| 2009/0119190 A1 | 5/2009 | Realini |
| 2010/0213253 A1 | 8/2010 | Wollbrand et al. |
| 2014/0025460 A1 | 1/2014 | Knowles et al. |

FOREIGN PATENT DOCUMENTS

| | | |
|---|---|---|
| WO | WO 2008/027621 A1 | 3/2008 |
| WO | WO 2008/088427 A1 | 7/2008 |
| WO | WO 2009/038511 A1 | 3/2009 |

\* cited by examiner

SECURE TOKENLESS TRANSACTION SYSTEM AND METHOD

CLAIM OF PRIORITY

This application claims priority to U.S. application Ser. No. 13/682,013 filed on Nov. 20, 2012, which claims priority to U.S. Application 61/563,066 filed on Nov. 23, 2011, the contents of both of which are fully incorporated herein by reference in their entirety.

FIELD OF THE INVENTION

The field of the invention and its embodiments relate to tokenless transaction systems that provide a convenient and secure way to complete a financial transaction. In particular, the present system stores user the information and implements a number of security protocols to protect the user before, during, and after completing a financial transaction.

BACKGROUND OF THE INVENTION

Nowadays, the average consumer has many tools at their disposal (i.e. credit cards, debit cards, rewards cards, etc.) stuffed in his/her wallet or billfold. Aside from the personal identification cards such as a driver's license, most people carry multiple credit cards, debit cards, promotional cards, and discount cards for various functions including financial transactions, cash retrievals, and money transfers. For example, according to creditcards.com, the average consumer in the U.S. possesses at least three separate credit cards.

It can be bewildering and burdensome to carry around many cards. When a consumer has multiple credit cards, debit cards, promotional cards, and discount cards, it is more likely that he/she would be confused as to which card serves what purpose, the limit on each card, the benefits of each card, and so forth. It is also more difficult to manage one's finances when multiple cards are carried around and used. A user probably would not be able to accurately track the use of a particular card for each transaction. For example, when a rarely-used card is employed to pay for a small purchase, the consumer may forget that the card was ever used, subjecting the consumer to possible transactional charges such as late fees.

Moreover, it can be unsafe to carry many cards/cash on your person. When the user takes one card out of the wallet, another card may be inadvertently dragged out and lost, subjecting the user to fraudulent financial transactions. An even greater risk emerges when a consumer loses his/her wallet and the entire collection of cards. Since the overwhelming majority of such cards do not have further security measures implemented, the user may suffer fraudulent charges as well as be exposed to identity theft. If a person is to use cash instead of a credit based system, the cash that can be stolen is essentially untraceable.

The current invention and its embodiments provides solutions to the above indicated problems. The tokenless transaction system introduced here permits the user to secure the relevant information regarding all of his/her credit card, debit cards, promotion cards, and discount cards in a single account. The tokenless transaction system reduces confusion by allowing the user to put away the physical copies of most of his/her cards. The user no longer needs to carry all the cards.

In the same manner, the chances to have a card lost or stolen are reduced, bolstering the security of the user's financial information. Moreover, when the user is fully verified with the system, the user can access the system through biometric recognition technologies such as fingerprint scanner or facial recognition. Such a "no card" access significant improves the security of the user's financial information.

Review of Related Technology:

U.S. Pat. No. 8,463,710 pertains to a tokenless biometric method for processing electronic transmissions, using at least one user biometric sample, an electronic identifier and an electronic rule module clearinghouse. The steps for processing of the electronic transmissions comprise of a user registration step, wherein a user registers with an electronic identifier at least one registration biometric sample taken directly from the person of the user.

U.S. Pat. No. 8,090,657 pertains to a system for authentication of financial transactions using a remote terminal includes apparatus for sampling a unique biological identifier of a system user. The system has particular relevance to credit card or other electronic funds transfer transactions whereby the user may complete a transaction over the Internet, or at a merchant's remote terminal by using a unique biological identifier in place of the credit card. The unique biological identifier is preferably a finger print which is read by a camera at the personal computer or remote terminal. The image is digitized and forwarded to a clearing house to identify the appropriate account for the required transaction to be processed.

U.S. Patent Application 2010/0212253 pertains to an all in one card, an arrangement and methods for contact- and contactless-services, e.g. payments, money transfer, electronic tickets or identity cards. The all in one card comprises a point of service interface for communication with a point of service, a card database, a mobile terminal interface for connect the card to a mobile terminal connectable to a telecommunication network. The card database can be controlled by the mobile terminal. The card database is configured for storing data and the card data can be accessed via the point of service interface. The date stored in the card database relates to e.g. bank cards, credit cards, identification, tickets, electronic money, identification 15 cards. The invention also comprises a mobile terminal (MT) suitable for communication with the card.

Various implements are known in the art, but their structures are distinctively different from the current invention. Moreover, the prior arts fail to address all of the problems solved by the invention described herein. The present invention and its embodiments allow for a user to conduct financial transactions without the need for cash or credit cards and the like. The present invention further uses a number of security measures to protect the user's identity. One embodiment of this invention is illustrated in the accompanying drawings and will be described in more detail herein below.

SUMMARY OF THE INVENTION

The present invention introduces a tokenless transaction system, which allows the user to compile the information for all of his/her credit card, debit cards, promotion cards, and discount cards—the cards directly involved in financial transactions—in a single database, which can be accessed by the businesses that are authorized to handle financial transaction by credit cards, debit cards, promotional cards, and discount cards. Through a secure portal or terminal, a user can register for an account and input all the necessary information for his/her cards and verification of his/her identity. The account serves as a "one-stop-shop" interface between the user and all his/her cards. The user can manage his/her cards and transactions with the account, reducing the likelihood of confusion and missing payments.

The present invention and its embodiments describe and teach a method of conducting a financial transaction, the method having the steps of at least one user accessing an electronic device capable of facilitating a financial transaction; the at least one user presenting at least one biometric identifier to the electronic device; the at least one user presenting an identification code to the electronic device; a financial institution verifying an identity of the at least one user; the at least one user selecting at least one financial account to complete the financial transaction; the at least one user completing the financial transaction; and upon completing the financial transaction, the electronic device assigning a new account number to the at least one financial account used to complete the financial transaction.

In another embodiment of the invention there is a computer implemented method of completing at least one financial transaction via an electronic device, the method having the steps of storing at least one account identifier in a financial institution database; storing at least one biometric identifier in the financial institution database; a user associated with the at least one account identifier and the at least one biometric identifier accessing the electronic device capable of facilitating a financial transaction; the user submitting the at least one account identifier and the at least one biometric identifier to the financial institution database via the electronic device; the financial institution database comparing the submitted at least one account identifier and the at least one biometric identifier to the stored at least one account number and the stored at least one biometric identifier, wherein if the stored identifiers match the submitted identifiers then access to a financial account is granted, and wherein if the stored identifiers do not match the submitted identifiers then access to the financial account is denied and the user is prompted to resupply the requisite identifiers; and wherein upon completion of the at least one financial transaction the at least one account identifier is modified subject to an encryption algorithm.

In another aspect of the invention there is a system for completing a financial transaction having an electronic device for accessing and facilitating the financial transaction, wherein the electronic device optionally does not have a card reading mechanism, and wherein the electronic device is configured to capture at least one biometric identifier; at least one database for storing account and biometric information to verify usage of accounts for the financial transaction, wherein the at least one database compares received information from the electronic device and compares it to the stored account and biometric information to match an account with the received information.

The tokenless transaction system may preferably make use of a point of sale or other remote terminal or any other electronic device capable of being connected to a network, which allows the user to access all his/her cards and choose any one or any combination of the cards to complete a transaction, such as a purchase or a cash withdrawal. By equipping a biometric recognition system such a fingerprint scanner, a retina scanner, or a facial recognition program, the terminal can be accessed direct without any card. The user can then designate, on the terminal, which of his/her credit card, debit card, promotional card, or discount card, or any combinations thereof, will be used for a particular transaction.

By designating the card(s) used for a transaction at a point of sale or cash withdrawal, the user enables the merchant making the sale or providing the cash to dial into a processing server to verify the designation. Once verified, the information may be relayed to the issuing financial institution or organization (i.e. bank, financial clearinghouse, etc.) for authorization and approval. When an approval is provided, the merchant then would be able to finish the transactions. Such a designation for a specific transaction can also be made at the terminal. The sequence of verification and approval is the same. The locations that have implemented the terminal enjoy the convenience that a user can access the terminal without any card. More customers may choose such locations in preference to other locations that are only equipped with regular card readers.

The tokenless transaction system reduces confusion by allowing the user to put most of the physical copies his/her cards away. The user no longer needs to carry all the cards. Similarly, the system improves security for the user's financial information by reducing the chance that a user's card is lost or stolen. The user may use an online account to access the system. Through encryption technology and other security measures, the user may input the information regarding his/her cards into the system and make the necessary designations. Moreover, when the user is fully verified with the system, he/she may be able to access the system through biometric recognition technologies such as fingerprint scanner or facial recognition. Such a "no card" access not only provides more convenience but also significant improves the security of the user's financial information.

It is an object of the present invention to provide a tokenless transaction system that absolves a user from having to carry a card to complete a financial transaction.

It is an object of the present invention to provide a tokenless transaction system that employs encryption algorithms to secure their financial information.

It is an object of the present invention to provide a tokenless transaction system that provides targeted advertising to the user.

It is an object of the present invention to provide a tokenless transaction system that takes a picture or video of the user completing the financial transaction.

It is an object of the present invention to provide a tokenless transaction system that requires at least two forms of identification to complete a financial transaction.

It is another object of the present invention to provide a tokenless transaction system that ensures a high level of security for the user's financial information and prevents identity theft.

It is another object of the present invention is to provide a tokenless transaction system that allows a user of the system to manage all the financial information regarding of his/her credit cards, debit cards, promotional cards, and discount cards on one account from one portal.

It is another object of the present invention is to provide a tokenless transaction system that allows a user to access the information of his/her credit card, debit card, promotional card and discounts at a terminal by using at least one biometric identifier for particular transaction.

It is yet another object of the present invention is to provide a tokenless transaction system that generates an alert to be sent to the user when a financial transaction the tokenless transaction system is taking place.

It is yet another object of the present invention to provide a tokenless transaction system that enables two users to engage in a financial transaction with each other.

DESCRIPTION OF THE PREFERRED EMBODIMENTS

Figure 1:
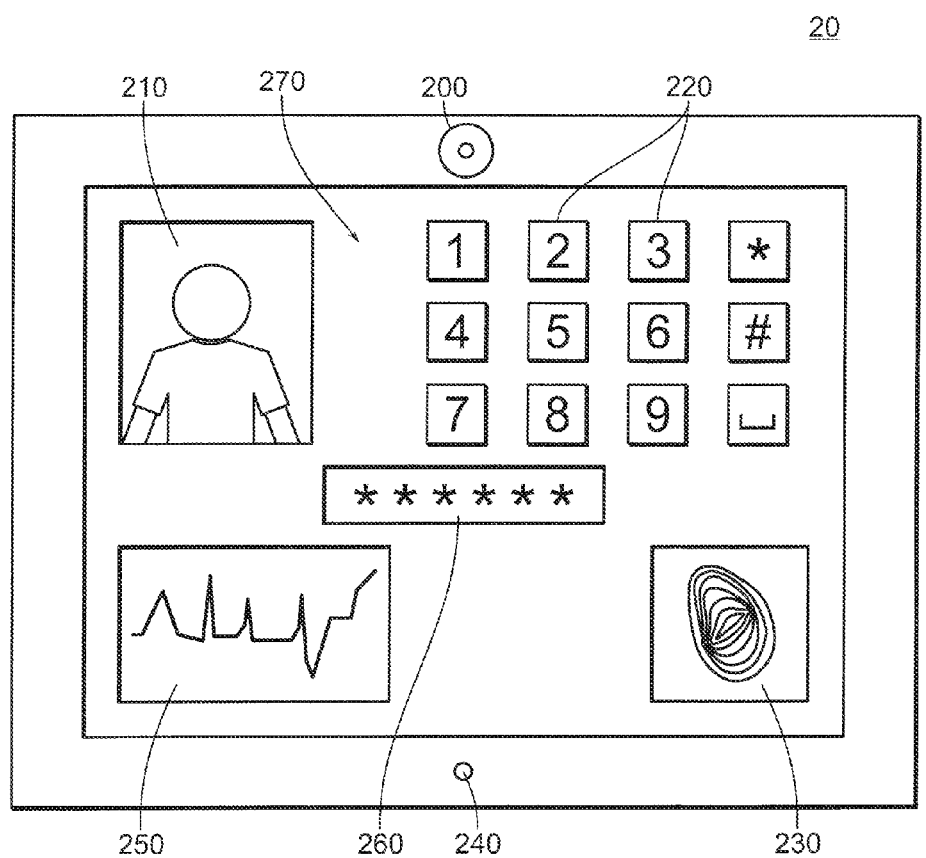
FIG. 1 is a representation of an interactive screen of the electronic device that begins the tokenless transaction process.

The preferred embodiments of the present invention will now be described with reference to the drawings. Identical elements in the various figures are identified with the same reference numerals.

Reference will now be made in detail to embodiments of the present invention. Such embodiments are provided by way of explanation of the present invention, which is not intended to be limited thereto. In fact, those of ordinary skill in the art may appreciate upon reading the present specification and viewing the present drawings that various modifications and variations can be made thereto.

FIGS. 1, 2, 3, and 5 provide a general representation of the tokenless transaction system as depicted on an electronic device. An electronic device 20 capable of being used with the present invention and its embodiments may be a point of sale terminal or other remote terminal, desktop computer, laptop computer, smartphone, tablet computer, PDA, smartwatch, music playing device, and the like or any combination thereof.

Referring now to FIG. 1, there is a representation of an introduction or welcome screen of the electronic device 20 that is shown when a user first interacts with the electronic device to complete a financial transaction.

The electronic device 20 should have a number of features that enable a tokenless transaction to be completed. The electronic device 20 should have at least a camera 200, a keypad 220, a microphone 240, and a fingerprint scanner 230. Further, a voice recognition module 250 may be employed.

The electronic device 20 is generally defined by a display screen 270 that may be of differing types and may provide for touch screen technology. The display screen 270 should be capable of displaying characters, images, logos, video, animations, or any combination thereof. The display screen 270 may provide for three-dimensional or holographic representations of items displayed on the screen.

A number of mechanisms can be used to initially identify the user attempting to access the system via the electronic device 20. For example, a user may have to submit at least one account identifier such as an account number, a personal identification number (PIN), social security number, or other unique personally identifying information. In some instances, biometric identifying information may also be supplied. This can include, voice or speaker recognition, vein scans, fingerprint scans, DNA, retinal scans, image captures (facial recognition), and the like or any combination thereof. In order to successfully access the system there may be a requirement to provide multiple types (i.e. both account based and biometric based) in order to authenticate the user.

If a user chooses or is required to supply various information that may be input into the system the user can use the keypad 220 to complete such input of information. The keypad 220 shown is merely representative and may comprise a full QWERTY or other acceptable keyboard or keypad depending on the user's preferences. The letters, numbers, characters, and so forth input by the keypad 220 should be represented in the input field 260. In some instances only the key last depressed will show up and others will be redacted using an asterisk or other appropriate masking measures.

Once an account connected to a user is identified, biometric information may be gathered and used to further access the system. For example, a user inputs their social security number and then uses the fingerprint scanner 230 to capture a representation of their fingerprint. The fingerprint scanner 230 may employ a number of measures including optical scanning and capacitance scanning. An algorithm can then compare the scanned fingerprint to a stored scan of the fingerprint in a database connected with the system or electronic device.

Using the camera 200, a representation of the user may be captured, either static or time varying, and used with facial recognition software to ascertain the identity of the user. Further, this may be done automatically as a security measure to capture an image of the user every time an authentication attempt is made thereby helping to identify potential scammers or other unscrupulous individuals. The image 210 of the user may be prominently displayed on the screen 270 and forwarded with an alert to the user who is connected with the account upon failing to complete the transaction or upon successfully completing a transaction.

The microphone 240 may work on conjunction with the voice recognition module 250. The selection of the voice recognition module 250 enables a spoken word, phrases, etc. to be uttered by the user and compared to a stored sample of the same or different word, phrase, etc. stored in a database operably coupled to the electronic device 20. The module preferably works under the principle of speaker recognition which recognizes who is speaking rather than what is being said. This enables a voice print to be compared as a one to one match.

The entire electronic device 20 and associated system may be controlled with speech recognition via the sound waves collected by the microphone 240. Directives such as "take image" and "enter PIN" may prompt certain screens to be displayed for proper entry of identifiers. Further, the user may use gestures that are captured by the camera or the electronic device 20 may be interacted with by the electronic device 10 being tilted, shook, or otherwise manipulated.

The electronic device 20 as described is intended to serve as an interface between the user and the greater financial transaction system as a whole. The user may set up an account online at via a website or web/mobile application through a secured portal. After certain verification regarding the user's identity, the user may store the information regarding his/her credit cards, debit cards, promotional cards, and discount cards in their dedicated account.

Thereafter, the user may use the electronic device 20 and system to choose which credit card, debit card, promotional card, and discount card can be used in a specific period of time. For example, while the user may have three cards for each type of cards, he may choose a Visa® credit card as the credit card to be used for the next five days and a MasterCard® credit card as the card to be used for the next thirty days. It should be noted that the types of cards mentioned herein are meant to be exemplary. There may be other types of cards and some special kinds of cards may not be easily categorized. No matter how many types of cards are possessed by the user, the system may allow the storage of the information and designation of what cards will be used for each category.

Figure 2:
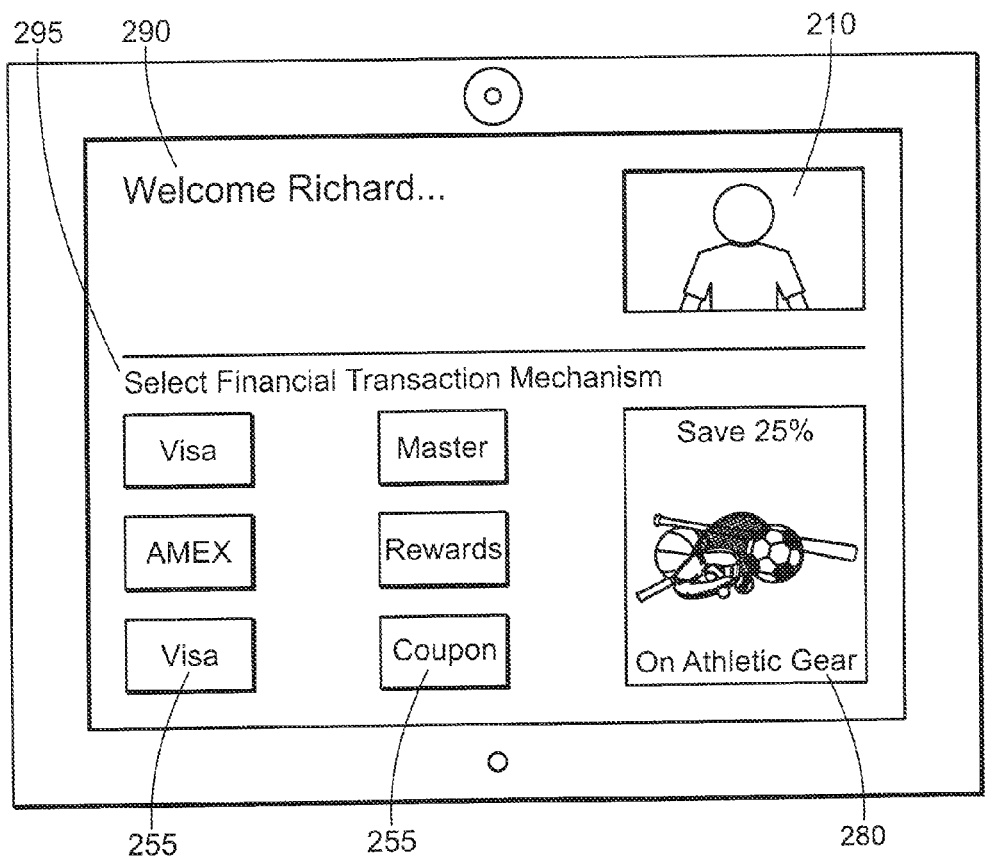
FIG. 2 is a representation of an interactive screen of the electronic device where account selection is completed.

Referring now to FIG. 2, there has been a successful attempt by a user to access the system via the electronic device 20.

With the user being fully identified, he/she may access all his/her card information and choose which card is to be used for a particular transaction. The user may browse his/her card selections and choose the card he/she wishes to use by pressing the individual account selection buttons 255 on the electronic device 20. It should be noted here that the types of cards shown are meant to be representative. The categorization of the cards and the specific way to show the cards on the electronic device 20 may vary according to the specific needs of the merchant and the specific transactions that need to be completed.

In addition, the system may identify the user by an identification area 290. The identification area 290 may have a displayed message such as "Welcome [USER]" and may be customizable by the user to suit their particular needs or desires. Further, an image 210 of the user may further be displayed throughout the transaction. This can enable a third party to verify the image 210 is of the person conducting the transaction thereby limiting theft and fraud.

Below, there may be a payment area 295. In the payment area 295 there are a number of accounts 255 tied to particular tools for conducting financial transactions. These may include but are not limited to credit cards, debit cards, checking accounts, savings accounts, rewards cards, coupons, store credit, and the like or any combination thereof. The accounts 255 may be individually selected or selected with another account 255 (i.e. credit card and rewards card) to complete a transaction.

Typically, an advertisement 280 will be displayed at some point or at multiple points along the buying/selling process. The advertisement 280 may give the user the option to purchase certain services or goods available for a limited time. The limited time may be the life of the transaction and will be void thereafter. If the user so desires, they may select by button, voice, finger, etc. the advertisement 280 in question. The advertisement 280 will display the various terms and conditions and explain what the user is receiving.

The user can select to keep the advertisement 280 or can dismiss the advertisement 280 upon which the advertisement 280 is either stored in the accounts 255 to be used at a later date or is removed from the system. After either selection or dismissal of the advertisement 280, at this point or any other during the transaction process, the account 255 for completing the transaction can be selected.

After the user has made the choice which card or cards will be used for a particular transaction, the terminal 20, by the operation of the merchant hosting the terminal 20, sends a request to the processing server; the processing server relays the request to the issuing banks for approval. The user and the merchant may finish the financial transaction when the approval is sent back. The designation inputted from the account does not apply to the terminal 20 because user's entire collection of cards can be accessed.

Figure 3:
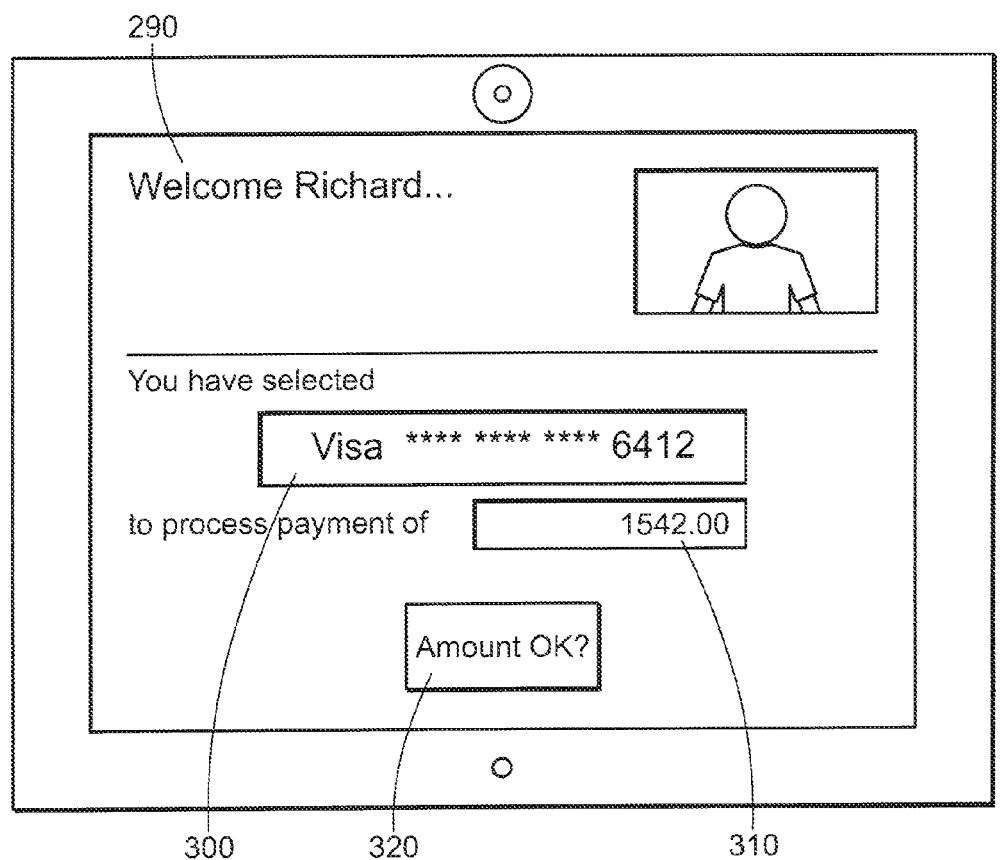
FIG. 3 is a representation of an interactive screen of the electronic device showing a verification process.

Referring now to FIG. 3, the user has selected the method of payment for conducting the financial transaction. The user must now verify the transaction.

The electronic device 20 displays a representation of a payment screen or page associated with the system. The identification area 290 is preferably still displayed. The payment area 295 now has functionality to confirm the selection of the account 255 shown in FIG. 3. The payment area 295 should at least display the card or account identifier 300, the payment amount 310, and the verification or submit button 320.

From this screen, users may be able to select a different account by tapping on the card identifier 300 in the event the wrong card was selected or the user has changed their mind. This prevents jumping from screen to screen and streamlines the payment process. The payment amount 310 identifies the amount to be paid by the user. The verification button 320 may be a touch sensitive button and may also respond to voice prompts, gestures captured by the camera, and the like or any combination thereof. The verification may repeat after an initial selection to prevent inadvertent selections of the submission of payment initially.

When a financial transaction is completed, the system may generate an alert to the user. The alert may take the form of an email to a specified email account the user entered, or an automated phone message, either textual or verbal, to a phone number the user is associated. The user may have the authority to allow or disallow the sending of such alerts. In addition, the user may set the threshold, e.g. transactions that involve more than $500, for generating the alerts. Such a design serves as an additional layer of security to ensure that the user is fully aware of his/her financial transactions and reduces the chances of misusing a lost or stolen card.

The current invention, therefore, allows the user to complete a financial transaction without a card. Such a design significant simplifies the transactions that may be needed. User, in turn, enjoys enormously improved convenience and security. If the electronic device 20 is implemented in a widespread manner, the user does not need any card to make a purchase or retrieve cash. All he/she needs is his/her biometrics, as well as remembering an access code, or other identifying information, or any combination thereof. The entire card collection may be accessed with ease and the user needs not to worry about lost or stolen cards.

The system and graphical representations shown in FIGS. 1-3 are meant to be demonstrative and may entail more or less functionality than what is shown in each FIG. The layout and particular customizations may vary from user to user as such features can be manipulated by the user. The system generally interacts with a database stored in a secure location and accessible by a bank, clearinghouse, or the like or any combination thereof. The system may be able to directly communicate with the database without an intermediary to approve of the transaction. In other instances, such approval may be required by the bank, clearinghouse, etc. to verify and cause payment to process.

Typically, a user must register with the system provider either online through a secure portal such as an encrypted webpage or web/mobile application. The user may also be able to register through a bank or other facility that can process their account information. In order to register the user needs to provide a number of identifying information such as account numbers, routing numbers, bank names/locations, social security numbers, PIN numbers, and the like or any combination thereof.

Further, supplying the biometric identifiers may be done solely under the discretion of the user or may require witnesses and documentation stating that the sample provided originates with the person who purports to own it. This ensures that theft or fraud is less likely and that anyone cannot connect a particular fingerprint to an account without the proper authorization to do so outside of simply obtaining an account number or the like. The user may also be able to connect more than one person to a particular account (i.e. spouse, parent, etc.) that allows them to access the same accounts. The system then stores the identifiers for each user connected with the account.

Once the user has completed the registration phase and their identifying information is in the system and database, the user can log on to their profile through the aforementioned portal, mobile app, web app, web page, etc. From there, the user can add, delete, or otherwise edit certain information and stylizations associated with their profile. In some instances, the user can verify and view purchase histories, locations, times, dates, etc. The user may also be able to select certain types of advertisements they want to see. The user can conduct financial transactions without the burden of carrying a wallet or plethora of credit cards with them.

Figure 5:
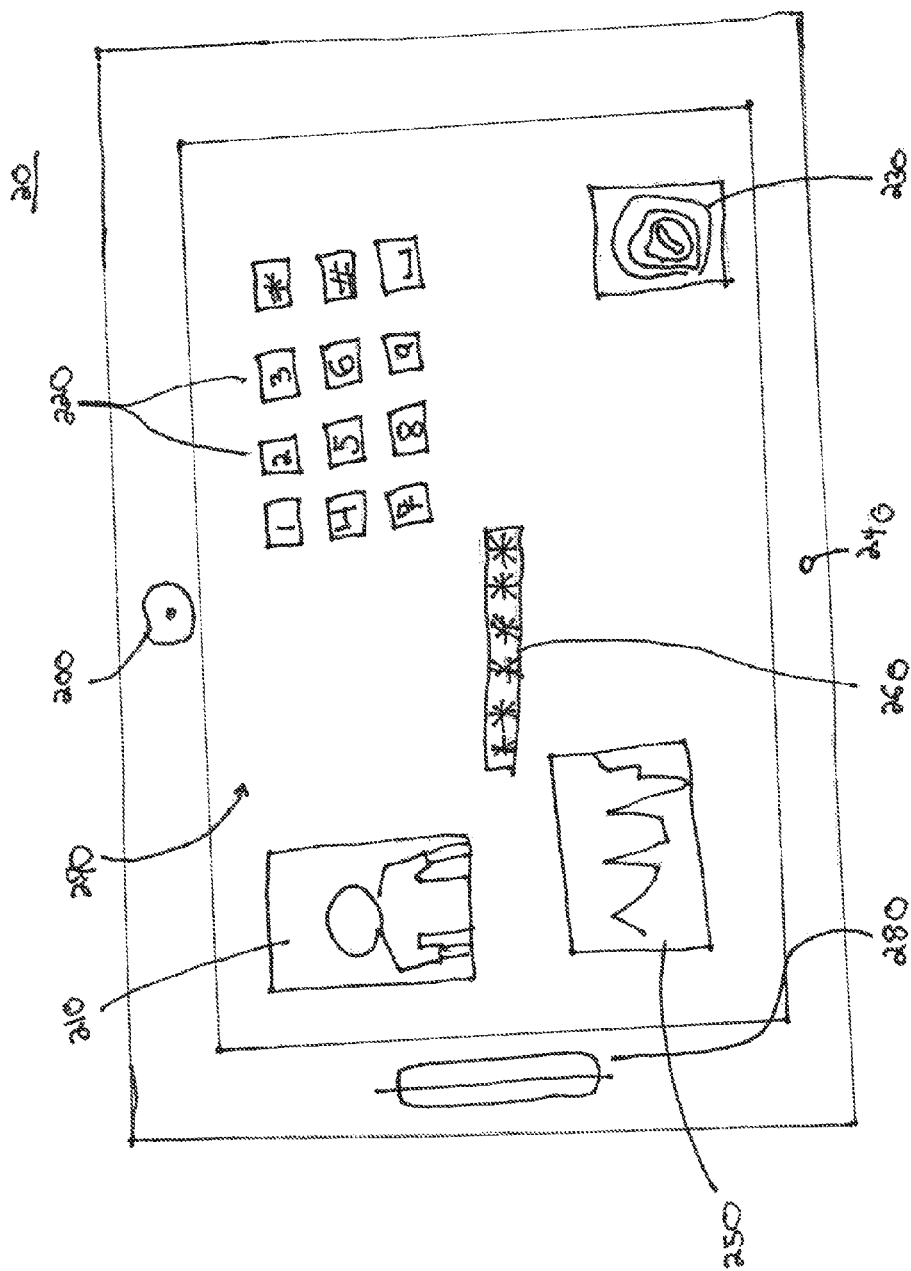
FIG. 5 is a representation of an interactive screen of an alternative embodiment of the electronic device.

Referring now to FIG. 5, an alternative embodiment of the electronic device 20 is shown. The electronic device 20 displays a representation of a payment screen or page associated with the system. In this embodiment, electronic device 20 is equipped with card reader 280. Card reader 280 is capable of reading information from any type of card that has an information-containing magnetic strip. Further, card reader 280 allows a user to use a credit card or gift card to pay for the ongoing transaction. This embodiment will also allow a user to associate the card that is inserted into card reader 280 with their user account. In some instances a user may simply pay with a card without associating it with their account, and in other instances the user will associate the card with the account.

Figure 4:
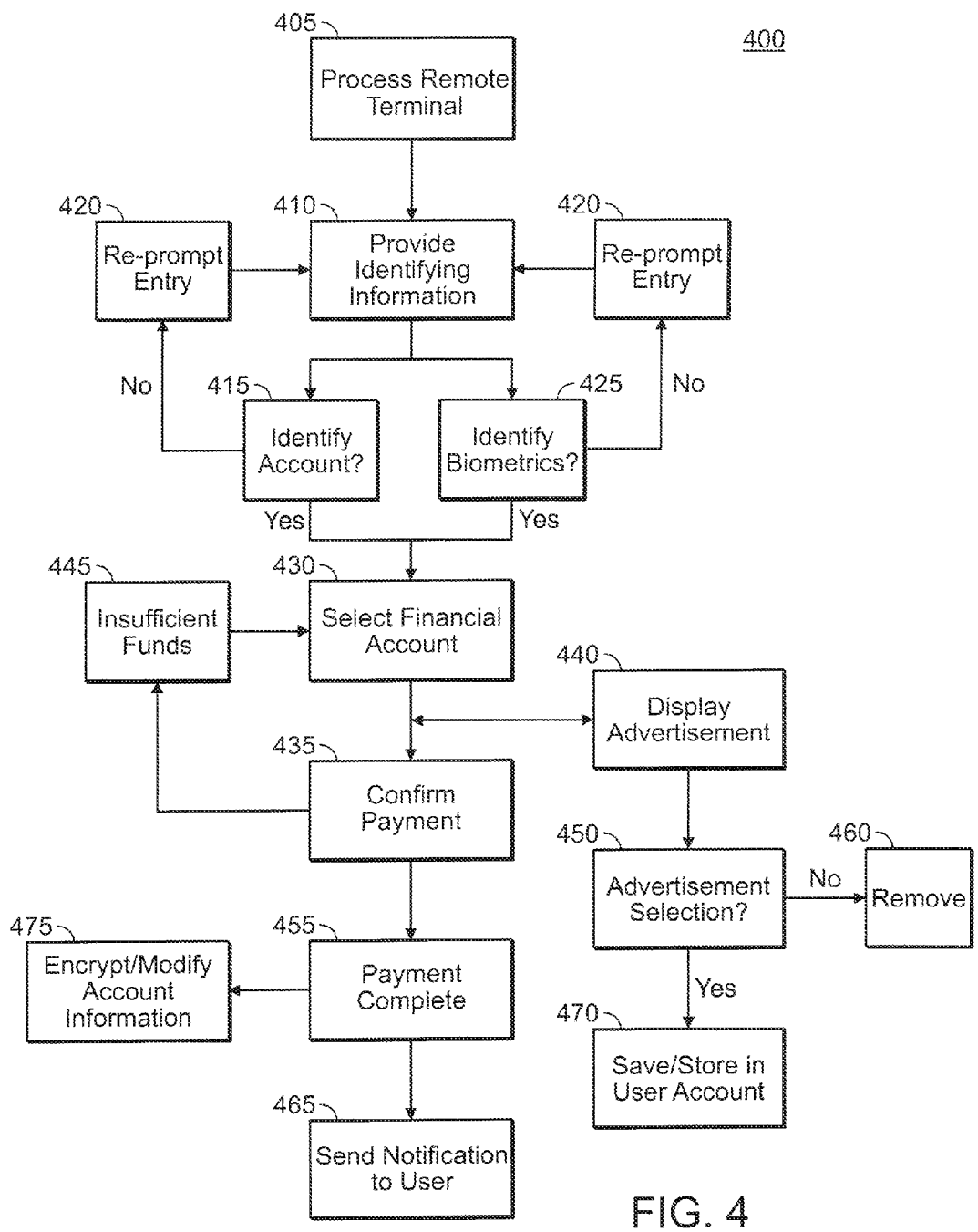
FIG. 4 is a flowchart illustrating a method of completing a tokenless financial transaction.

Referring now to FIG. 4, there is a flowchart illustrating a general method 400 of use of the system as a whole. The user must first select an item(s) to be purchased or sold.

In step 405, the user then accesses a remote terminal or electronic device to conduct the purchase or sale. The electronic device may be a laptop computer, desktop computer, PDA, smartphone, smartwatch, gaming system, music playing device, remote terminal, point of sale terminal, or the like or any combination thereof. In a preferred embodiment, the electronic device is a point of sale terminal accessible to the public or otherwise available.

In step 410, the user provides identifying information to the electronic device which may be either personal identifying information to identify their account as shown in step 415 and/or biometric information as shown in step 425.

In step 415, the user can provide personal identifying information related to birthdates, personal identification numbers (PIN), social security number, account numbers, routing numbers, bank names, passwords, and the like or any combination thereof in order to access their account. The system preferably requires at least one of these personal identifiers in order to help authenticate the identity of the user. The user may manually enter the information into the electronic device using a keypad or other discreet means as to not make others privy to their sensitive information.

In step 425, the user can provide at least one biometric sample to the electronic device. The biometric sample can be speaker recognition (voice recognition), fingerprint scan, vein scan, DNA sample, image capture, retinal scan, and the like or any combination thereof. Preferably, the system requires at least one of these biometric identifiers as to ascertain the identity of the user in case the personal identifying information becomes compromised.

In each of step 415 and 425, the supplied identifier is then compared to the previously stored identifier in the database. If the identifier matches, then the process can proceed to step 430. If there is a "no match" or "inconclusive match" the system may re-prompt the user for entry into the electronic device in step 420. After a number, preferably at least two failed attempts, the user will be prevented from attempting another entry until the system has provided clearance to the user and resolved the discrepancy taking place assuming the correct user was attempting to complete the transaction.

In step 430, the user has successfully logged into the system and can now select a financial account to complete the transaction. The account may be any one of a checking account, savings account, credit card account, debit card account, rewards card account, coupon, or the like or any combination thereof. These accounts are preferably added before beginning the transaction process although it may possible to add another account at that time. Such an addition may first require authorization from a bank, clearinghouse, or the like.

At some point or multiple points in the transaction, and not necessarily where shown along the flow chart, an advertisement may be displayed in step 440. The advertisement displayed may be an advertisement offering an incentive to continuing to make purchases in the same location or another. The advertisements are preferably targeted towards the user based on the purchasing history, use or declination of past advertisements, amount of money available in their accounts, current location, locations of past purchases, current purchase, time of purchase, and the like or any combination thereof.

For example, if someone just bought a basketball hoop for their yard, the advertisement may offer 25% off the purchase of a basketball. Likewise, certain purchases can lead the system employing an algorithm to predict the need for future purchases or offer certain incentives in the location where a number of purchases have been made. A number of factors can influence the location (GPS), type (prior sales), amount (credit limits), etc. of the offered advertisement and the examples given above are merely representative of some possibilities.

In step 450, the user can select the advertisement. This can be done to learn more about the product or services being offered, the terms and conditions of use, and the like. The user can then make a decision whether to accept the offer or decline the offer.

In step 460, the user has either taken no action or actively declined the offer presented to them by the advertisement. The system logs and stores this action and can either offer the advertisement again at another time or remove the offer from taking place. This declination, as noted, as can influence future offers or advertisements to which the user will be presented.

In step 470, the user has accepted the advertisement and the advertisement is saved to their user account. The offer stemming from the advertisement may have a predetermined lifetime and after which the advertisement will be removed from their user account. The user, upon initiating another transaction, will have the option to select the coupon, reward, etc. offered by the advertisement when selecting the form of payment at the account selection screen.

To further complete the transaction, the user can confirm payment with the selected account in step 435. Payment can be confirmed with the push of a button or a voice command such as "confirm payment" or gesture or other acceptable means. The payment information then is submitted to the system and its database. The payment is then preferably analyzed by a bank, clearing house, or the like to verify the proper funds exist to complete the transaction upon which proper notification of the completed transaction is given in step 455. However, the payment may be declined, as shown in step 445. The user must then select another form of payment or not complete the transaction.

Once the payment is complete, a notification is sent to the user in step 465. The notification may comprise an SMS, email, picture message, voice message, or the like or any combination thereof. In some instances, when completing the transaction, the camera is activated and a representation of the user completing the transaction can be captured. This image can then be sent with the notification, which may be particularly helpful in failed transaction attempts to identify the potential perpetrator.

In step 475, upon completion of the transaction, the account information of the user is encrypted and/or otherwise modified. The purpose being that this allows for enhanced security when conducting the types of transactions described above. If the account information is constantly being encrypted or modified with each purchase, then the account information has a relatively low chance of being stolen and used for nefarious gains.

Further, the system can store and log such information and have it tied into a bank, clearing house, or the like which may allow for the account number itself to be physically changed with each transaction that occurs. This further can prevent someone from accessing your account because the account number will never be the same from transaction to transaction. Essentially this is a form of encryption occurring at a different level then where encryption normally occurs in conducting such transactions. Typically encrypted information stays the same, but is not readable without the key or other decoding mechanism. In this instance, the information is ever changing and further may have a level of encryption placed over this change that occurs with each transaction. This coupled with the potential image capture of each user attempting to conduct a financial transaction can be used to create a secure system that can safely hold people's financial information.

Although this invention has been described with a certain degree of particularity, it is to be understood that the present disclosure has been made only by way of illustration and that numerous changes in the details of construction and arrangement of parts may be resorted to without departing from the spirit and the scope of the invention.

What is claimed is:

1. A method of conducting a financial transaction, the method comprising:
    at least one user accessing an electronic device capable of facilitating a financial transaction via a financial transaction program;
    the at least one user presenting at least one biometric identifier to the electronic device;
    the at least one user presenting at least one account identifier to the electronic device;
    a financial institution verifying an identity of the at least one user;
    the at least one user selecting at least one financial account to complete the financial transaction;
    the at least one user verifying the financial transaction; and
    upon completing the financial transaction, the financial transaction program assigning a new account number to the at least one financial account used to complete the financial transaction
    wherein the financial transaction is optionally between two users' financial accounts.

2. The method of claim 1 further comprising the step of:
    the electronic device displaying at least one advertisement to the at least one user during the course of completion of the financial transaction.

3. The method of claim 2 further comprising the step of:
    upon display of the at least one advertisement the at least one user accepting or denying the at least one advertisement,
        wherein if the at least one user denies the at least one advertisement, then the at least one advertisement is null, and
        wherein if the at least one user accepts the at least one advertisement, then the at least one advertisement is stored in the electronic device for future use.

4. The method of claim 2 wherein the at least one advertisement is an offer for a reduction in price on at least one purchasable item.

5. The method of claim 1 wherein the electronic device is an interactive point of sale terminal.

6. The method of claim 1 wherein the biometric identifier is a retinal scan, fingerprint scan, DNA sample, voice recognition reading, vein pattern scan, or any combination thereof.

7. The method of claim 6 wherein at least two biometric identifiers are required to complete the financial transaction.

8. The method of claim 1 wherein the electronic device logs the location and nature of the financial transaction and the item or items purchased.

9. The method of claim 8 wherein the at least one advertisement is targeted based on the logs generated by the electronic device.

10. The method of claim 1 wherein the new account number is an encrypted number.

11. A computer implemented method of completing at least one financial transaction via an electronic device, the method comprising:
    storing at least one account identifier in a financial institution database;
    storing at least one biometric identifier in the financial institution database;
    a user associated with the at least one account identifier and the at least one biometric identifier accessing the electronic device capable of facilitating a financial transaction,
        wherein the electronic device contains computer readable instructions for executing a program for conducting financial transactions;
    the user submitting the at least one account identifier and the at least one biometric identifier to the financial institution database via the electronic device;
    the financial institution database comparing the submitted at least one account identifier and the at least one biometric identifier to the stored at least one account number and the stored at least one biometric identifier,
        wherein if the stored identifiers match the submitted identifiers then access to a financial account is granted, and
        wherein if the stored identifiers do not match the submitted identifiers then access to the financial account is denied and the user is prompted to resupply the requisite identifiers; and
    wherein upon completion of the at least one financial transaction the at least one account identifier is modified subject to an encryption algorithm,
    wherein the financial transaction is optionally between two users' financial accounts.

12. The method of claim 11 wherein the at least one account identifier is at least one of a name, PIN number, account number, a captured representation of a person, social security number, password, or any combination thereof.

13. The method of claim 11 wherein the at least one biometric identifier is a retinal scan, fingerprint scan, DNA sample, voice recognition reading, vein pattern scan, or any combination thereof.

14. The method of claim 11 wherein the electronic device is a remote point of sale terminal, smartphone, tablet, smartwatch, gaming device, laptop computer, desktop computer, PDA, or any combination thereof.

15. The method of claim 11 further comprising the step of:
the electronic device presenting at least one targeted advertisement to the user during the course of completion of the at least one financial transaction.

16. The method of claim 11 further comprising the step of:
a camera operably coupled to the electronic device capturing a representation of the user making at least one financial transaction.

17. The method of claim 11 further comprising the steps of:
the financial institution database storing information related the at least one financial transaction; and
the financial institution sending an alert to the user based on the stored information,
wherein the alert comprises details of the at least one financial transaction and an image of the user conducting the at least one financial transaction.

* * * * *